US009283905B2

(12) United States Patent
Herthan (10) Patent No.: US 9,283,905 B2
(45) Date of Patent: Mar. 15, 2016

(54) ERROR AVOIDANCE IN THE GESTURE-CONTROLLED OPENING OF A MOTOR VEHICLE DOOR AND TRUNK (71) Applicant: Brose Fahrzeugteile GmbH & Co. KG, Hallstadt, Hallstadt (DE)

(72) Inventor: Bernd Herthan, Michelau (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 5 days.

(21) Appl. No.: 14/156,099

(22) Filed: Jan. 15, 2014

(65) Prior Publication Data

US 2014/0136024 A1 May 15, 2014

Related U.S. Application Data (63) Continuation of application No. PCT/EP2012/002880, filed on Jul. 9, 2012.

(30) Foreign Application Priority Data

Jul. 15, 2011 (DE) .......................... 10 2011 107 279

(51) Int. Cl.
*G06F 17/00* (2006.01)
*B60R 16/023* (2006.01)
(Continued)

(52) U.S. Cl.
CPC ......... *B60R 16/0231* (2013.01); *B60R 25/2045* (2013.01); *B60R 25/2054* (2013.01);
(Continued)

(58) Field of Classification Search
CPC ........... A63F 9/24; A63F 13/10; A63F 13/12; E05B 65/12; G06K 9/00; G06K 9/00355; H04N 13/02; H04N 7/18; B60R 25/2045; B60R 1/00; B60R 16/0231; G06F 3/017; G06F 3/01; G06F 3/044; G06F 19/00; G06F 3/033; G08B 6/00
See application file for complete search history.

(56) References Cited

U.S. PATENT DOCUMENTS 5,929,769 A    7/1999  Garnault
7,308,112 B2*  12/2007 Fujimura ........... G06K 9/00355
                                                382/103
(Continued)

FOREIGN PATENT DOCUMENTS

CN    101010477 A    8/2007
CN    101519935 A    9/2009
(Continued)

OTHER PUBLICATIONS

Chinese Office Action for Chinese Application No. 201280035101.1 dated Jun. 3, 2015—English translation.
(Continued)

*Primary Examiner* — Behrang Badii
(74) *Attorney, Agent, or Firm* — Muncy, Geissler, Olds & Lowe, P.C.

(57) ABSTRACT

For error-proof, gesture-controlled opening of an actuating element in a motor vehicle, provision is made to detect a vehicle user's gesture, which conveys an opening command, by means of a sensor, to check a control behavior for activating at least one further gesture-controlled actuating element of the motor vehicle for plausibility in accordance with at least one predetermined criterion and, upon identification of the opening command, to refuse the opening of the actuating element if, in a temporal relationship with the identification of the opening command, the control behavior for activating the further actuating element is identified as being implausible.

10 Claims, 4 Drawing Sheets

(51) Int. Cl.
    *B60R 25/20* (2013.01)
    *G08B 6/00* (2006.01)
    *H04N 7/18* (2006.01)
    *G06F 3/044* (2006.01)
    *A63F 9/24* (2006.01)
    *G06F 19/00* (2011.01)
    *G06F 3/01* (2006.01)
    *B60R 1/00* (2006.01)
    *G06K 9/00* (2006.01)

(52) U.S. Cl.
    CPC ... *A63F 9/24* (2013.01); *B60R 1/00* (2013.01); *G06F 3/01* (2013.01); *G06F 3/044* (2013.01); *G06F 19/00* (2013.01); *G06K 9/00* (2013.01); *G08B 6/00* (2013.01); *H04N 7/18* (2013.01)

(56) References Cited

U.S. PATENT DOCUMENTS

| | | | |
|---|---|---|---|
| 8,091,280 B2 | 1/2012 | Hanzel et al. | |
| 8,228,166 B2 | 7/2012 | Eberhard | |
| 8,469,806 B2 * | 6/2013 | Grant | A63F 13/10 463/22 |
| 8,788,152 B2 | 7/2014 | Reimann et al. | |
| 2007/0018790 A1 | 1/2007 | LaFrance | |
| 2007/0205863 A1 | 9/2007 | Eberhard | |
| 2010/0185341 A1* | 7/2010 | Wilson | B60R 25/2045 701/1 |
| 2011/0021272 A1* | 1/2011 | Grant | A63F 13/10 463/30 |
| 2011/0276234 A1 | 11/2011 | Van Gastel | |
| 2012/0207345 A1* | 8/2012 | Tang | G06F 3/017 382/103 |
| 2013/0079985 A1* | 3/2013 | Wolf | E05B 83/36 701/36 |
| 2014/0009273 A1* | 1/2014 | Grant | A63F 13/10 340/407.1 |
| 2015/0316998 A1* | 11/2015 | Tang | G06F 3/017 345/156 |

FOREIGN PATENT DOCUMENTS

| | | |
|---|---|---|
| CN | 102015381 A | 4/2011 |
| DE | 102 06 968 A1 | 8/2003 |
| DE | 103 07 673 A1 | 9/2004 |
| DE | 10 2004 041 709 B3 | 10/2005 |
| DE | 10 2005 032 402 B3 | 9/2006 |
| DE | 10 2009 017 404 A1 | 11/2009 |
| DE | 10 2008 063 366 A1 | 7/2010 |
| DE | 10 2010 037 509 A1 | 3/2012 |
| EP | 0 770 749 A2 | 5/1997 |
| EP | 1 970 265 A2 | 9/2008 |
| GB | 2 447 484 A | 9/2008 |
| WO | WO 02/086825 A1 | 10/2002 |

OTHER PUBLICATIONS

German Search Report for German Application No. 10 2011 107 279.2 dated Jun. 15, 2012 with English translation.

* cited by examiner

ERROR AVOIDANCE IN THE GESTURE-CONTROLLED OPENING OF A MOTOR VEHICLE DOOR AND TRUNK

This nonprovisional application is a continuation of International Application No. PCT/EP2012/002880, which was filed on Jul. 9, 2012, and which claims priority to German Patent Application No. DE 10 2011 107 279.2, which was filed in Germany on Jul. 15, 2011, and which are both herein incorporated by reference.

BACKGROUND OF THE INVENTION

1. Field of the Invention

The present invention relates to a method for gesture-controlled opening of an actuating element in a motor vehicle. The invention also relates to an associated actuating device. The actuating element to be opened is, in particular, an automatically movable trunk lid or an automatically operable sliding side door of a motor vehicle. As a general rule, however, the invention can also be applied to other actuating elements with which openings in the body shell of a motor vehicle can be opened in a motorized manner, for example a motorized sunroof or a motorized convertible top. Such actuating elements to be opened are referred to below as a "closing element."

2. Description of the Background Art

Use of gesture-controlled actuating devices for automatically moving motor vehicle trunk lids is a recent development. With such an actuating device, the vehicle user produces an open command by executing a defined gesture, in particular a certain hand or foot movement, in the vicinity of the closing element. The actuating device senses the vehicle user's gesture by means of a proximity sensor and, by analyzing the sensor signals, checks whether the sensed gesture matches specific criteria stored for an open command. In the event that the actuating device recognizes the request for opening, it initiates opening of the closing element, which is to say opening of the trunk lid, for example. Gesture detection primarily employs capacitive proximity sensors, which detect the approach of the command-issuing body part in a contactless manner.

It is a disadvantage, however, that such a gesture-controlled actuating device is relatively susceptible to interference events that are not based on a genuine opening request by the vehicle user, and that often are not even elicited by a gesture on the part of the vehicle user. For example, such interference events can be produced by splashing water or by an inanimate object approaching the sensor of the actuating device, in particular by the wash water and/or the brushes of a car wash. Under such circumstances, opening of the closing elements must be avoided in order to prevent damage to the vehicle.

In order to prevent erroneous opening of a gesture-controlled trunk lid, sometimes the sensor signals of a gesture-controlled trunk lid actuating device are tested for plausibility, with the actuating device only opening the trunk lid when the sensor signals are recognized as "plausible" based on predefined criteria. "Plausibility" is present here when the sensor signals correspond to predefined expected values for ordinary, appropriate user behavior. For example, an actuating device provided for moving a motor vehicle trunk lid suppresses opening of the trunk lid when it detects multiple successive events in the sensor signal within a few seconds indicating an open command. Such a sensor signal is classified as "implausible" here because under normal operating conditions it is not to be expected that a vehicle user will want to open the trunk lid multiple times in such a short period of time. However, such a plausibility test cannot prevent erroneous opening of the trunk lid under all imaginable circumstances.

SUMMARY OF THE INVENTION

It is therefore an object of the present invention to avoid the erroneous opening of a motor vehicle closing element by a gesture-controlled actuating device as a result of an interference event, with especially high reliability. In particular, interference events such as those typically caused in a car wash by splashing water and/or brush motion are to be reliably detected in a simple and effective manner.

In the course of the method according to the invention, a gesture of a vehicle user communicating an open command is detected by means of a sensor. Furthermore, a control behavior for operating at least one additional gesture-controlled actuating element of the motor vehicle is tested for plausibility based on predefined criteria. Upon detection of an open command, the opening of the closing element is refused if the control behavior for operating the additional actuating element is recognized as implausible in a predefined time relationship with the detection of the open command.

According to an embodiment of the invention, therefore, the sensor signal associated with the closing element itself is not subjected to a plausibility test, or at least not only that sensor signal is subjected to a plausibility test. Instead, the opening of the closing element is made conditional—potentially additionally—on the circumstance that the control behavior with which at least one additional gesture-controlled actuating element is operated is also plausible. This approach is based on the realization that the gestures of a vehicle user that communicate an open command always take place in a narrowly limited area, and thus as a general rule are only detected by one sensor. In contrast, it is known that interference events such as splashing water, for example, are frequently not limited to a narrow locality, but instead typically affect the entire vehicle, or at least relatively large areas of the vehicle, at the same time. Consequently, as is known, a time coincidence of implausibilities in the control behaviors of multiple actuating elements is a strong indicator for the presence of an interference event, and hence is used according to the invention to distinguish interference events from genuine user commands.

The closing element that is to be opened according to the method is preferably a trunk lid or sliding side door of the motor vehicle. The additional actuating element whose control behavior is subjected to the plausibility test is, in particular, an automatically lockable and unlockable door lock of a motor vehicle side door. Preferably, the control behavior for operating the door locks of all four side doors is included in the plausibility test.

The "control behavior" that is detected for the plausibility test conceptually includes the control commands issued within a predefined detection interval for operating the additional actuating element, or every additional actuating element, and their time sequence. In other words, the control behavior is characterized by the nature and separation in time of the control commands or sensor signals provided for operating the additional actuating element.

This control behavior is evaluated as "plausible" when it conforms to a normal, expected user behavior in accordance with at least one stored plausibility criterion. Otherwise, the control behavior is classified as "implausible." However, because of the greater ease of implementation, the plausibility test is preferably performed on the basis of a negative exclusion method in which negative plausibility criteria are used to test for one or more example cases of implausible control behavior, and in which the control behavior is evaluated as "plausible" if none of these negative plausibility criteria is met.

Detection of the open command stands "in a time relationship" with the control behavior judged to be implausible when the property of the control behavior on which the implausibility is based occurs simultaneously with the detection of the open command, within a predefined time period before the detection of the open command, and/or within a predefined time period after the detection of the open command.

In useful fashion, the formulation of the plausibility criterion, or of every plausibility criterion, is accomplished based on empirical findings concerning typical, reasonable, and appropriate user behavior or concerning characteristic properties of typical interference events.

Consequently, in an embodiment of the invention the control behavior for operating the additional actuating element is detected as implausible when the control behavior contains two opposite (i.e., contradictory) control commands at the same time. If the additional actuating element is a door lock, then a control behavior that, in particular, causes the associated door lock sensors to simultaneously report both a locking command and an unlocking command by the vehicle user is classified as implausible in this circumstance. This plausibility criterion is based on the expectation that it is not reasonable for a vehicle user to deliberately issue contradictory control commands.

In addition or as an alternative to this, the control behavior for operating the additional actuating element preferably is detected as implausible when the control behavior contains at least a predefined plurality of control commands within a predefined (short) time interval. In the case of a door lock as the additional actuating element, for example, a control behavior that contains more than three control commands (i.e., locking commands, unlocking commands, or a combination of the two) within a short time interval of, for example, 5 seconds, is detected as implausible. This plausibility criterion is based on the recognition that, as a general rule, it is not necessary for a vehicle user to carry out the same control action many times within a short time interval.

With regard to a refined plausibility test, in a useful further development of the invention the control behavior for operating at least two additional gesture-controlled actuating elements of the vehicle is additionally or alternatively evaluated in a comparative manner and thus jointly tested for plausibility. Just as in the core concept of the invention, this further development is also based on the idea that user commands are always local events and thus with high probability affect only a single actuating device, while interference events such as splashing water generally occur over large areas and thus with high probability affect multiple actuating devices in the motor vehicle at the same time. In view of this insight, the control behavior is detected as implausible in the above-described further development of the invention when it contains at least one control command for each of the two additional actuating elements at the same time or one after the other within a predefined (short) time interval.

In a special manifestation of the principle of this method, which is specifically oriented toward the detection of interference events in a car wash, the control behavior for operating all four door locks of the motor vehicle side doors is evaluated in a comparative manner. In this design, the control behavior for operating these door locks is detected as implausible when it contains exclusively control commands for both front door locks in a predefined earlier time interval, while in a predefined later time interval it contains—exclusively or at least additionally—control commands for both rear door locks. This plausibility criterion takes into account the fact that not only do typical car washes process both sides of a motor vehicle symmetrically, so that the door lock sensors of mutually corresponding side doors are, with high probability, subjected to interference signals approximately at the same time, but in addition car washes generally process a car from front to back, so that the door lock sensors for the front side doors are subjected to interference signals earlier than the door lock sensors of the rear side doors. This complex plausibility criterion makes it possible to detect interference events typically produced by a car wash with extremely high reliability, and thus to reliably prevent opening of the closing element in a car wash under all imaginable circumstances.

Considerations of human anatomy and mobility can additionally enter into the formulation of plausibility criteria. For example, it is not possible for a human user to grasp and release a door handle many times within a few seconds; consequently, in a useful embodiment of the invention a signal from a door lock sensor integrated into a door handle indicating such a motion is evaluated as "implausible."

In an embodiment, the control behavior for operating the additional actuating element, or every additional actuating element, is continuously tested for plausibility. In this design, the opening of the actuating element is disabled for a predefined time period when the control behavior is detected as implausible. This ensures in an especially simple way and without loss of time that only open commands that stand in time relationship with the implausibility of the control behavior are blocked. However, within the scope of the invention it is also possible as a general rule that the control behavior for operating the additional actuating element, or every additional actuating element, is not tested for plausibility until an open command is detected.

In an embodiment, the actuating device for gesture-controlled opening of the closing element comprises a sensor for detecting the gesture with which the vehicle user properly indicates an open command. The actuating device further comprises a positioner for opening the closing element and a controller that is configured to detect the open command based on a signal transmitted by the sensor and to operate the positioner of the closing element upon detection of the open command. According to the invention, the controller can be provided with, or—in the installed state—is provided with, operating information about the control behavior of an additional actuating device used for gesture-controlled opening of an additional actuating element of the motor vehicle. The controller in this design is configured to refuse to open the closing element when the operating information reflects an implausible control behavior for operating the additional actuating device.

The operating information here can directly reflect the control behavior for operating the additional actuating device. Hence, it can directly contain the control commands that characterize the control behavior and their arrangement in time. In this case, it is useful for the control unit itself to be configured to test the control behavior for plausibility.

In an alternative embodiment of the actuating device, the plausibility test takes place in a test module separate from the controller. In this case the operating information provided to the controller already contains a determination—obtained by analyzing the control behavior—of the plausibility of the control behavior. In a useful embodiment, the separate test module is integrated—in particular by software means—into a controller for keyless access control (hereinafter referred to as an "access control system," also as a "keyless go" controller or "keyless entry" controller).

The sensors used to detect the vehicle user's gesture communicating the open command and for detecting other control commands are, in particular, capacitive sensors. However, optical sensors can additionally or alternatively be used for this purpose as well.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
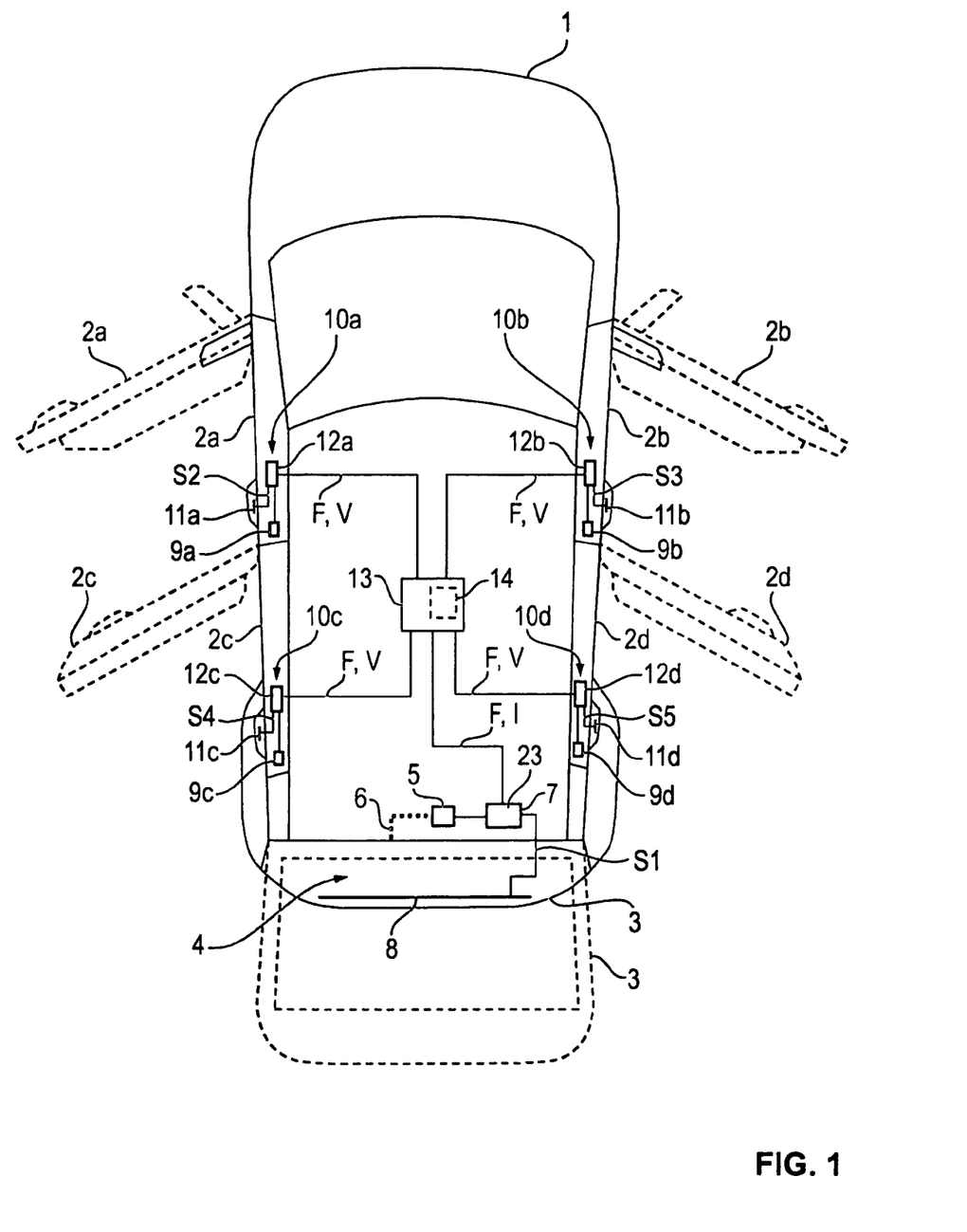
FIG. 1 is a schematic top view of a motor vehicle with an actuating device for gesture-controlled opening of a trunk lid, with four additional actuating devices for gesture-controlled unlocking and locking of the door locks of the four side doors, and with an access control system for keyless access control.

FIG. 1 shows a schematic top view of a motor vehicle 1 with four side doors 2a to 2d, of which the side doors 2a and 2b are associated with the front seats of the motor vehicle 1, and the side doors 2c and 2d are associated with the rear seats of the motor vehicle 1. The motor vehicle 1 further comprises a trunk lid 3.

The trunk lid 3 is reversibly pivotable in a motorized manner by means of a (first) actuating device 4 between a closed state (shown in solid lines) in which it closes the body shell of the motor vehicle 1 and an open state (indicated by dashed lines) in which it uncovers a trunk opening of the motor vehicle 1. In this respect, the trunk lid 3 constitutes a "closing element" within the meaning of the definition above.

The actuating device 4 comprises a motor-driven electric positioner 5, which acts on the trunk lid 3 through an actuating mechanism 6 (which is merely suggested). The actuating device 4 further comprises a controller 7 that is connected to the positioner 5 to operate it. In a useful embodiment, the controller 7 is implemented by a microcontroller with control software implemented therein.

The actuating device 4 is an actuating device for gesture-controlled opening of the trunk lid 3. The actuating device 4 here includes a (trunk lid) sensor 8 for detecting a gesture of a vehicle user expressing an open command.

In the example shown, the sensor 8 is a capacitive proximity sensor with one or more elongated sensor electrodes that are arranged under the trunk lid 3 in the rear bumper of the motor vehicle 1 and that detect in a contactless manner the approach of the foot of the vehicle user. In this event, the sensor 8 transmits a corresponding sensor signal S1 to the controller 7, which tests this sensor signal S1 for a match with specific criteria stored for an open command.

Provision is made, for example, that the vehicle user executes a brief kicking motion in the direction of the rear bumper as a gesture for communicating the open command. The approach of the foot to the sensor 8 causes a momentary increase in the electrical capacitance measurable at the sensor 8; this physical effect is exploited for the sensor 8 to detect the gesture.

The controller 7 calculates the capacitance to ground of the electrode strip, or every electrode strip, of the sensor 8 from the sensor signal S1 to detect the open command. In this process, it detects the open command in that the capacitance, or every capacitance, increases in a pulsed manner for a time interval that is within predefined time limits. Upon detecting an open command, the controller 7 causes the opening of the trunk lid 3 by appropriately operating the positioner 5 if a plausibility test described in detail hereinafter produces a positive result.

Each of the side doors 2a to 2d can be manually pivoted between a closed state (shown in solid lines) and an open state (indicated by dashed lines). In the closed state, each side door 2a to 2d can be actuated, which is to say reversibly locked and unlocked, by means of an associated door lock 9a to 9d. An additional actuating device 10a to 10d is associated with each door lock 9a to 9d for automatic actuation.

Figure 3:
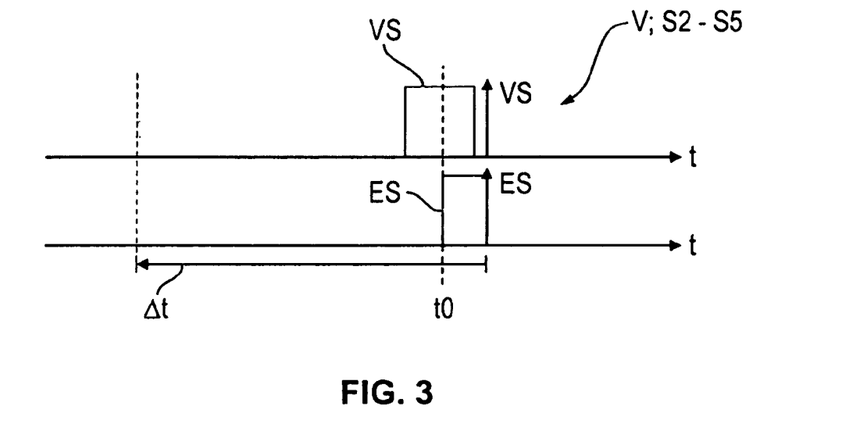
FIG. 3 is a synchronized diagram over time of the sensor signal from a door lock sensor, having a locking signal and an unlocking signal, which contains simultaneous conflicting control commands as an example case of an implausible control behavior for operating the associated door lock.

These additional actuating devices 10a to 10d, too, are gesture-controlled actuating devices with which a vehicle user can trigger locking or unlocking by a hand movement. To this end, each of the actuating devices comprises a (door lock) sensor 11a to 11d for detecting these gestures and a controller 12a to 12d for detecting a locking or unlocking command based on a sensor signal S2, S3, S4, or S5 supplied by the relevant sensor 11a to 11d. As in the case of the sensor 8, the additional sensors 11a to 11d are capacitive proximity sensors that contactlessly detect the approach of the hand issuing the command. Here, each of the sensors 11a to 11d includes two sensor electrodes integrated into the door handle of the relevant side door 2a to 2d, namely a locking electrode and an unlocking electrode, which contactlessly detect the approach of the hand. The sensor signal S2, S3, S4, or S5 supplied by each of the sensors 11a to 11d is correspondingly divided in each case into a locking signal VS (FIG. 3) and an unlocking signal ES (FIG. 3).

The controllers 12a to 12d preferably are each likewise composed of a microcontroller with control software implemented therein. The relevant controller 12a to 12d detects a locking or unlocking command in that the measurable capacitance between the locking or unlocking electrode of the relevant sensor 11a and ground rises in a pulsed manner, with the controller 12a to 12d appropriately operating the door lock 9a to 9d upon detection of a locking or unlocking command.

The motor vehicle 1 has a controller for keyless access control (hereinafter referred to as access control system 13) as a higher-level controller for the actuating devices 4 and 10a to 10d. The access control system 13 is configured to communicate with a "radio key" of the vehicle user through a radio transmitter (not shown) when the radio key is sufficiently close to the motor vehicle 1. In order to prevent the motor vehicle 1 from being opened by an unauthorized person, the access control system 13 activates the gesture control of the actuating devices 4 and 10a to 10d by transmitting an activation signal F only when it detects the matching radio key. In contrast, gesture control of the actuating devices 4 and 10a to 10d is deactivated by the access control system 13 when the radio key is out of radio range of the access control system 13.

In order to minimize the risk of erroneous detection of an open command for the trunk lid 3, and hence the risk of unintended opening of the trunk lid 3, the controller 7 makes the opening of the trunk lid 3 additionally dependent on a plausibility test in which the control behavior V for operating the door locks 9a to 9d is evaluated. The control behavior V, which is to say the totality of the detected locking and unlocking commands, is supplied to the access control system 13 by the controllers 12a to 12d and is stored by the test module 14 for a preceding detection interval Δt (FIG. 3) of, for example, 5 seconds in a time-resolved manner. In the course of this plausibility test, the control behavior V is then tested to determine whether this control behavior V corresponds to predefined expectations for a genuine user behavior. Only in the event that the control behavior V is evaluated as "plausible" does the controller 7 cause the opening of the trunk lid 3 upon detection of an open command. Otherwise, if the control behavior V is evaluated as "implausible," the opening of the trunk lid 3 upon detection of an open command is refused by the controller 7. Thus, the trunk lid 3 remains closed even in the event of detection of an open command by the actuating device 4 if the control behavior V exhibits an implausibility during the foregoing detection interval Δt.

Figure 2:
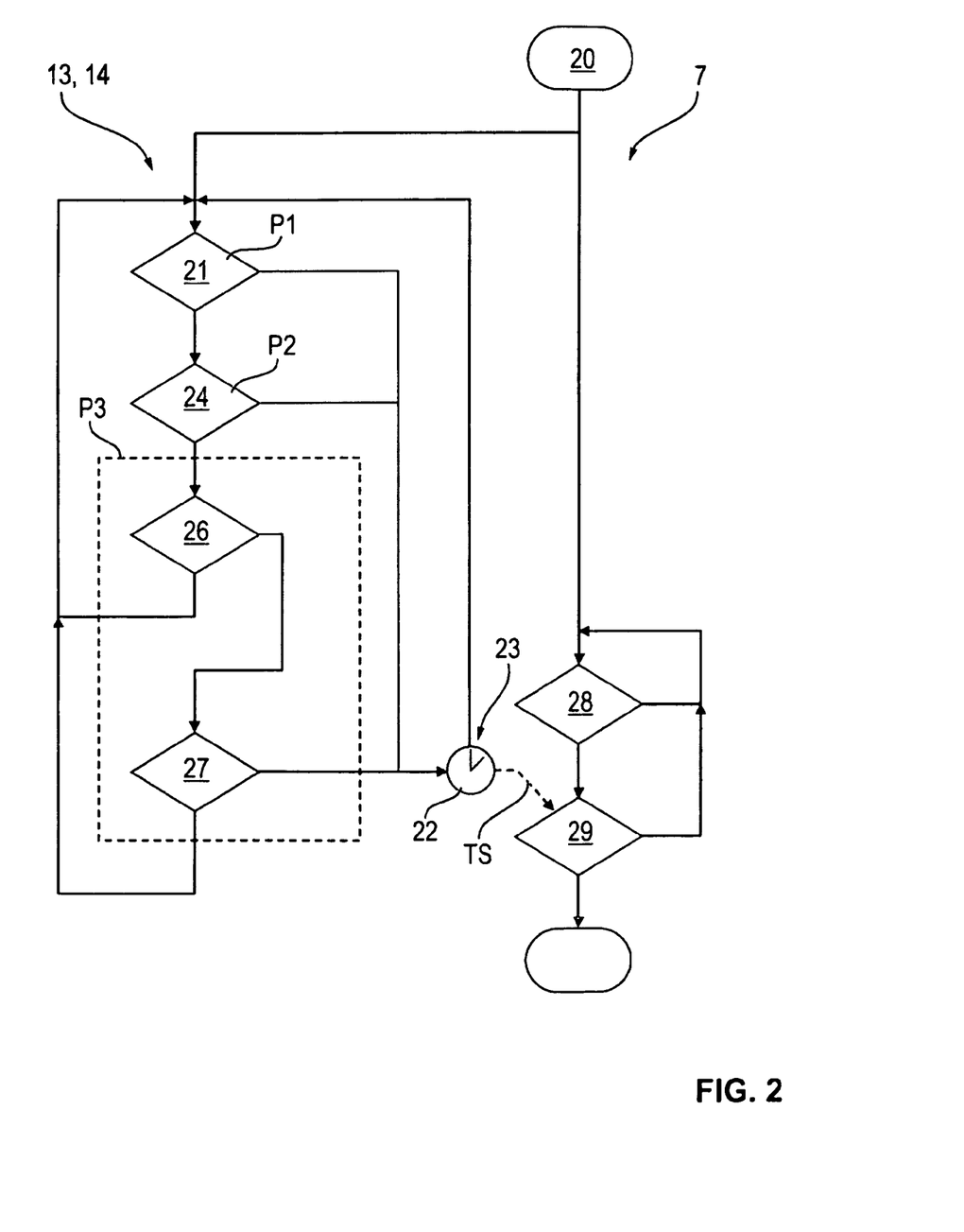
FIG. 2 is a schematically simplified flow diagram of a method carried out by the access control system and the trunk lid actuating device for gesture-controlled opening of the trunk lid subject to plausibility testing of the control behavior for operating the door locks.

This method for opening the trunk lid 3, illustrated in detail in FIG. 2, is carried out automatically by a cooperative division of labor between the controller 7 and the access control system 13. The plausibility test here is carried out by a test module 14, which is implemented by software means in the access control system 13.

The method is started in an initial step 20 with the closing of the trunk lid 3.

After the method starts, in a step 21 that implements a first plausibility criterion P1 the test module 14 first tests whether the control behavior V for one of the door locks 9a to 9d contains simultaneous contradictory control commands during the detection interval Δt. A corresponding example case is illustrated schematically in FIG. 3 using two synchronized diagrams in which the locking signal VS and the unlocking signal VE of one of the sensor signals S1 to S4 are represented over time t in a simplified manner. In the example case shown, a coincidence of a locking command and an unlocking command occurs at a time t0 within the detection interval Δt, recognizable by overlapping pulses of the locking signal VS and the unlocking signal ES.

If applicable, which is to say when simultaneous contradictory control commands occur for one of the four door locks 9a to 9d, the test module 14 evaluates the control behavior V as implausible and outputs corresponding operating information I to the controller 7, on the basis of which, in a step 22, a timer 23 with a duration of, for example, 10 seconds is started by the controller 7.

Figure 4:
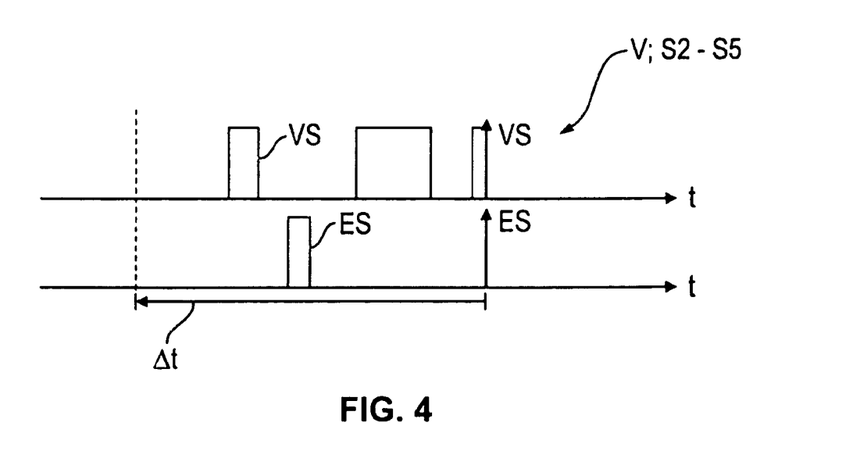
FIG. 4, in a representation as in FIG. 3, shows the sensor signal from a door lock sensor, which reflects more than three control commands within a short detection interval as another example case of an implausible control behavior.

Otherwise, which is to say when no simultaneous contradictory control commands occur for any of the four door locks 9a to 9d, in a step 24 that implements a second plausibility criterion P2, the test module 14 tests whether the control behavior V for one of the door locks 9a to 9d contains more than three control commands (i.e., pulses in the locking signal VS or unlocking signal ES) during the detection interval Δt. This case is shown by way of example in FIG. 4. If applicable, the test module 14 again evaluates the control behavior V as implausible and again transmits corresponding operating information I to the controller 7 which again starts the timer 23 with the step 22.

Figure 5:
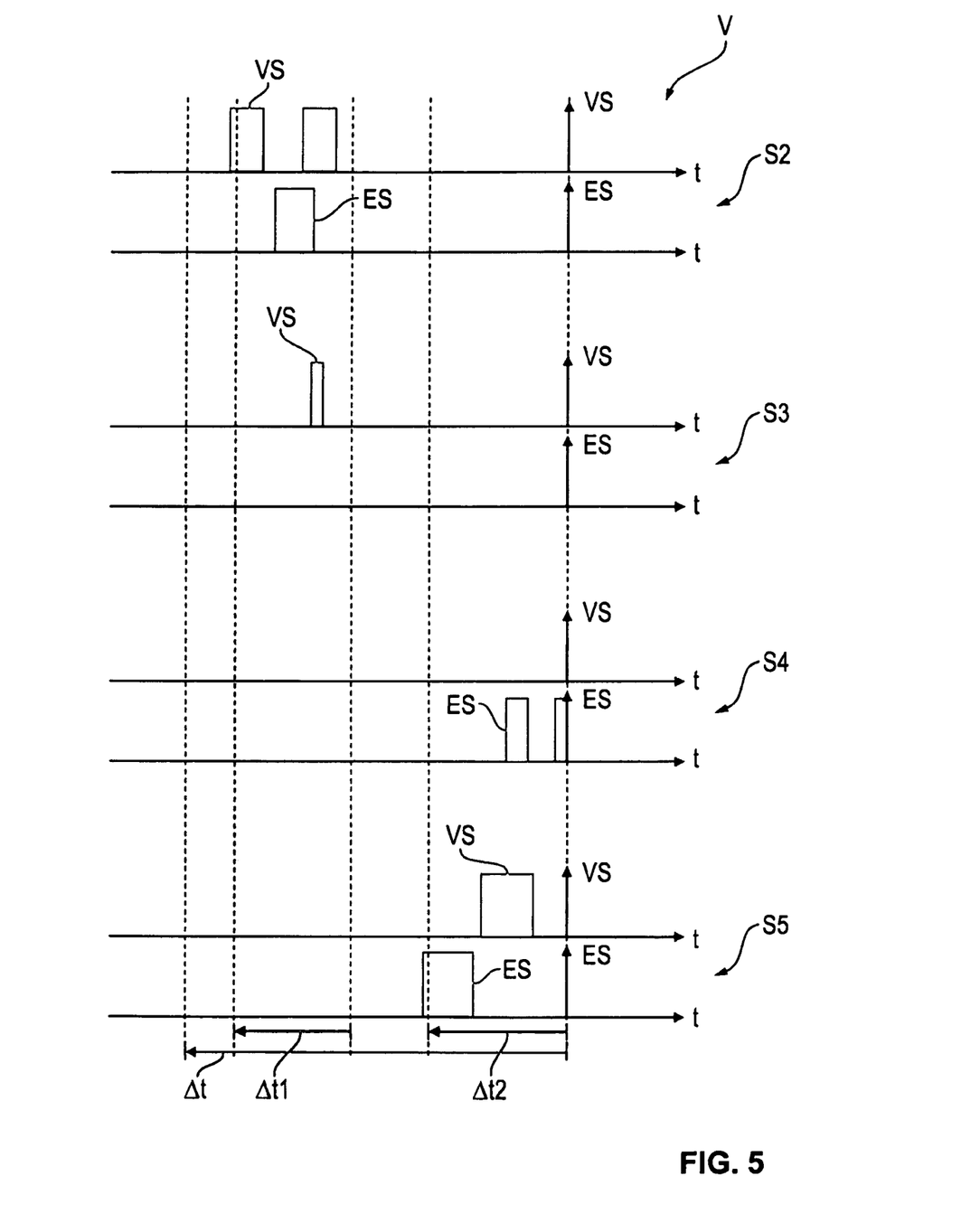
FIG. 5 shows in eight synchronized diagrams over time, the sensor signals from the four door lock sensors, according to which the two front door locks are subjected to control commands before the two rear door locks as another example of an implausible control behavior.

Otherwise, the test module 14 tests a third plausibility criterion P3, within the scope of which the test module 14 evaluates the sensor signals S2 to S5 for operating the individual door locks 9a to 9d in a comparative manner (see also FIG. 5). To this end, the test module 14 first tests, in a step 26, whether both of the sensor signals S2 and S3 associated with the front door locks 9a and 9b contain control commands during a first, earlier subinterval Δt1 of the detection interval Δt, while the sensor signals S4 and S5 associated with the rear door locks 9c and 9d contain no control commands. If this is the case, which is to say that the control behavior V contains control commands only for the sensor signals S2 and S3 associated with the two front door locks 9a to 9b, the test module 14 transitions to a subsequent step 27. Otherwise, the test module 14 jumps back to step 21.

In step 27, the test module 14 now tests whether both of the sensor signals S4 and S5 associated with the rear door locks 9c and 9d contain control commands during a second subinterval Δt2 of the detection interval Δt, while control commands are absent from the sensor signals S2 and S3 associated with the front door locks 9a and 9b.

If this is the case, or in other words if only the rear door locks 9c and 9d were subjected to control commands during the second subinterval Δt2, the test module 14 again evaluates this control behavior V as implausible and again transmits the corresponding operating information I to the controller 7, which thereupon starts the timer 23 (step 22) again. Otherwise, the test module 14 again jumps back to step 21.

In parallel with the plausibility test carried out by the test module 14 in the access control system 13, in a step 28 the controller 7 tests the sensor signal S1 for the presence of an open command. As indicated above, the controller 7 interprets a pulse of the sensor signal S1 having a length within predefined limits, e.g., between 0.5 seconds and 2 seconds, as an open command.

Step 28 is repeated in this process until the controller 7 detects an open command. As soon as this is the case, the controller 7 queries a timer signal TS of the timer 23 in a subsequent step 29 to test whether the timer is running. If this is the case, the controller 7 jumps back to step 28. Otherwise, which is to say if the timer 23 has expired, in a final step 30 of the method the controller 7 causes the opening of the trunk lid 3 if the radio key is still in range.

Thus, by the above-described method the gesture-controlled opening of the trunk lid 3 is blocked by the run time of the timer 23 (10 seconds, for example) in each case if the control behavior V is classified as implausible as determined by one of the plausibility criteria P1-P3.

In a departure from the above-described exemplary embodiment, one or two of the three plausibility criteria described can be omitted or exchanged for other plausibility criteria in the plausibility test. Likewise, the plausibility test can also contain more than three plausibility criteria. Provision can optionally be made for the timer 23 to be started with different run times as a function of the plausibility criteria satisfied. For example, the timer 23 can be started with a longer run time (30 seconds, for example) when plausibility criterion P3 is satisfied than when one of the plausibility criteria P1 or P2 is satisfied. The plausibility test implemented in the access control system 13 in the foregoing example can also be implemented as a variation in the controller 7. In this case the operating information I transmitted by the access control system 13 to the controller 7 contains the operating behavior V in its original, unprocessed form. As a general rule, however, it is also possible within the scope of the invention to implement the plausibility test in full or in part in one or more of the controllers 12*a* to 12*d*.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for gesture-controlled opening of a first actuating element in a motor vehicle, the method comprising:
   detecting via a sensor a vehicle user's gesture communicating an open command;
   testing a control behavior for operating at least one additional gesture-controlled actuating element of the motor vehicle for plausibility based on at least one predefined criterion; and
   refusing, upon detection of the open command, the opening of the first actuating element if the control behavior for operating the additional actuating element is recognized as implausible in a time relationship with the recognition of the open command.

2. The method according to claim 1, wherein the control behavior for operating the additional actuating element is recognized as implausible if the control behavior substantially simultaneously contains two contradictory control commands.

3. The method according to claim 1, wherein the control behavior for operating the additional actuating element is recognized as implausible if the control behavior contains at least a predefined plurality of control commands within a predefined time interval.

4. The method according to claim 1, wherein the control behavior for operating two additional gesture-controlled actuating elements of the motor vehicle is tested for plausibility, and wherein the control behavior is detected as implausible when the control behavior contains at least one control command for both of the additional actuating elements within a predefined time interval.

5. The method according to claim 4, wherein the control behavior for operating the four door locks of the motor vehicle is tested for plausibility, and wherein this control behavior is detected as implausible when the control behavior contains exclusively control commands for the two front door locks in a predefined first time interval, and in a subsequent predefined second time interval contains control commands for the two rear door locks.

6. The method according to claim 1, wherein the opening of the first actuating element is disabled for a predefined time period when the control behavior for operating the additional, or each additional, actuating element is detected as implausible.

7. An actuating device for gesture-controlled opening of a first actuating element of a motor vehicle, comprising:
   a sensor for detecting a vehicle user's gesture indicating an open command;
   a positioner for opening the actuating element;
   a controller configured to detect the open command based on a sensor signal transmitted by the sensor and configured to operate the positioner to open the first actuating element upon detection of the open command,
   wherein the controller is provided with operating information about the control behavior of an additional actuating device used for gesture-controlled opening of an additional actuating element of the motor vehicle, and
   wherein the controller is configured to refuse to open the first actuating element when the operating information reflects an implausible control behavior for operating the additional actuating device.

8. The actuating device according to claim 7, wherein the operating information directly reflects the control behavior for operating the additional, or each additional, actuating element, and wherein the controller is configured to test the control behavior for plausibility.

9. The actuating device according to claim 7, further comprising a test module separate from the controller, wherein this test module is configured to test the control behavior for plausibility and to provide the operating information to the controller, and wherein the operating information contains a determination of the plausibility of the control behavior.

10. The actuating device according to claim 9, wherein the separate test module is integrated into a controller for keyless access control to the motor vehicle.

* * * * *